May 16, 1933.  A. EGLI  1,909,395
MAGNETO
Filed July 29, 1931  2 Sheets-Sheet 1

INVENTOR
Albert Egli
BY Clinton S. James
ATTORNEY

May 16, 1933.  A. EGLI  1,909,395
MAGNETO
Filed July 29, 1931  2 Sheets-Sheet 2

INVENTOR
Albert Egli
BY Clinton S. Janes
ATTORNEY

Patented May 16, 1933

1,909,395

UNITED STATES PATENT OFFICE

ALBERT EGLI, OF SIDNEY, NEW YORK, ASSIGNOR TO SCINTILLA MAGNETO COMPANY, INC., OF SIDNEY, NEW YORK, A CORPORATION OF NEW YORK

MAGNETO

Application filed July 29, 1931. Serial No. 553,787.

This invention relates to magnetos and more particularly to rotors constituting the permanent magnetic elements thereof.

Magneto rotors as heretofore constructed include a permanent magnetic element or elements which are machined to shape. Since the magnet steel is extremely hard, this machine work is difficult and costly, requiring special tools and equipment. Moreover, the material lost in the machining operations is an important item of cost since this type of steel is very expensive.

It is an object of the present invention to provide a novel magnet rotor which is efficient in operation, strong and rigid in construction, economical to manufacture and easily assembled.

It is another object of the invention to provide such a device in which the magnet elements require no machining or other expensive operations.

It is a further object to provide such a device in which the various component parts are largely in the form of stampings or forgings so shaped as to form, upon assembly thereof, a rigid unitary structure.

Further objects and advantages will be apparent to those skilled in this art from the following description taken in connection with the accompanying drawings in which :—

Figure 1:
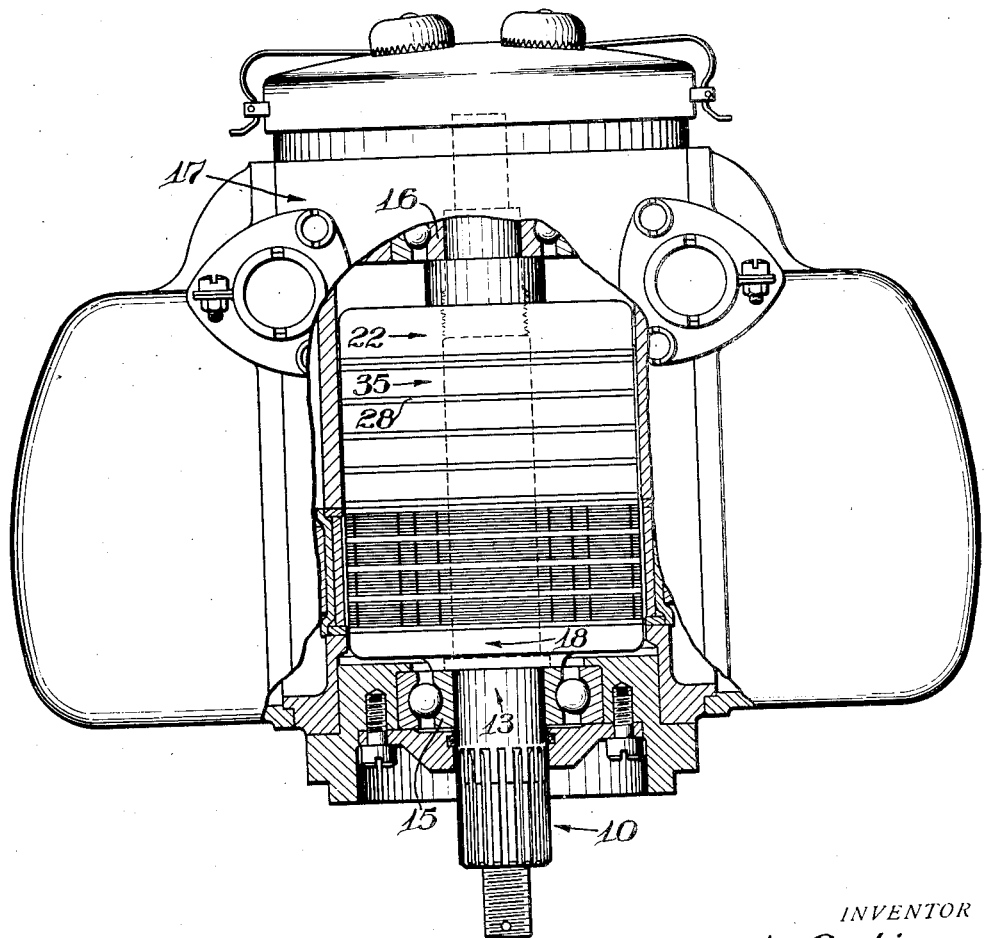
Fig. 1 is a side elevation of a dual magneto partly broken away in order to show a rotor constituting a preferred embodiment of the invention.

According to the present invention, the magneto rotor comprises a shaft 10, preferably of non-magnetic material, splined and threaded as indicated at 11 and 12 for a suitable driving connection and provided with bearing seats 13 and 14 to receive bearings 15 and 16 (Fig. 1) whereby the rotor is mounted in the frame 17 of the magneto.

Figure 3:
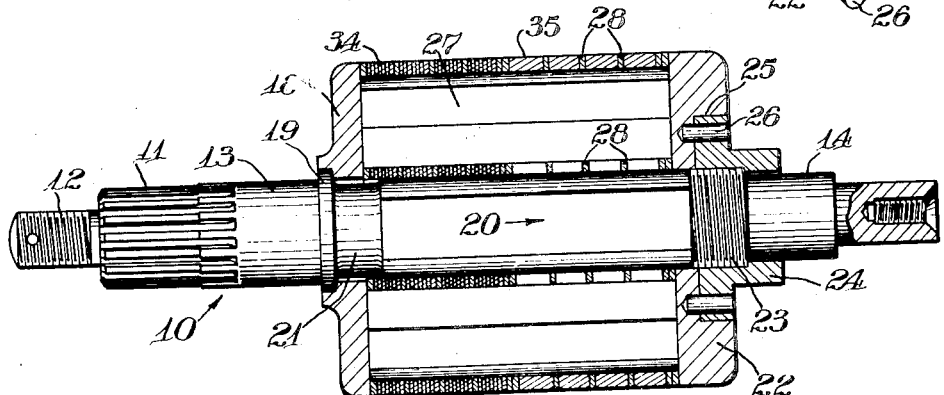
Fig. 3 is a longitudinal sectional view of the rotor.

An end plate 18 of suitable non-magnetic material is mounted on the shaft 10 adjacent the bearing seat 13. This plate may be formed integral with the shaft or may, as illustrated, be formed separately and arranged to seat against a flange 19 (Fig. 3) on the shaft. If desired the shaft may be reduced in diameter adjacent the flange 19 as indicated at 21 and the plate 18 may be forged into said reduced portion in order to rigidly connect the plate with the shaft. The shaft 10 is squared as indicated at 20 for a portion of its length extending from the reduced portion 21, and a magnetic bridge member 22 is arranged to be splined on said squared portion of the shaft. At the end of the squared portion, the shaft is reduced and threaded as shown at 23 in order to receive a clamp nut 24 which is arranged to seat in a recess 25 of the bridge member 22 and to be connected rigidly thereto when the parts are assembled by means such as drift pins 26.

Permanent magnets in the form of steel bars 27 of uniform cross section are adapted to be mounted in parallel relation with the shaft 10, circumferentially spaced around said shaft between the end plate 18 and bridge member 22. Any suitable even number of these bars may be used, four being herein illustrated, the magnets being arranged in alternation as respects the polarity so as to form, in conjunction with the bridge member 22, in effect a four-pole U-shaped magnet.

Figure 2:
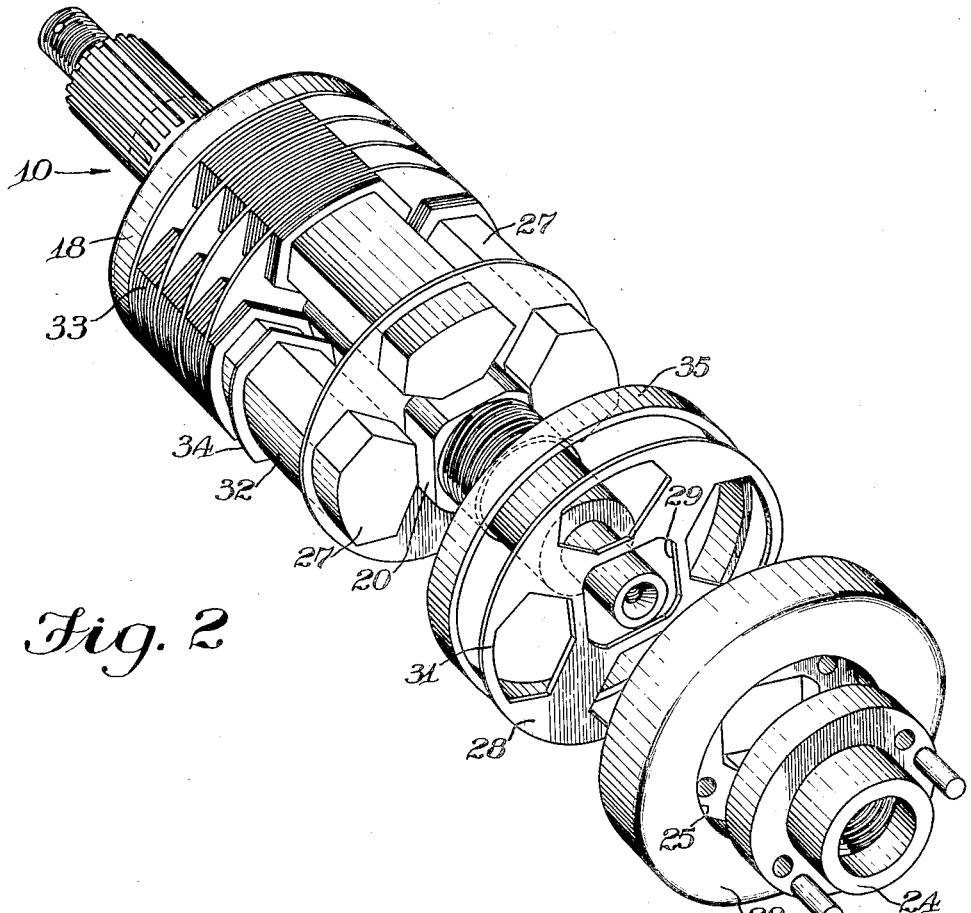
Fig. 2 is an expanded view of the rotor in perspective.

In order to support the magnet bars 27 in proper spaced relation, and to connect them for rotation with the shaft 10, a plurality of supporting members in the form of discs 28 of non-magnetic metal are provided having central openings 29 (Fig. 2) arranged to fit on the squared portion 20 and having circumferentially spaced openings 31 to receive the bars 27. The bars 27 are preferably formed with a non-circular cross section as indicated, with outer surfaces 32 cylindrical and coaxial with the shaft 10. Since the openings 31 in discs 28 are arranged to closely fit said bars, the latter are prevented from rotation, and the surfaces 32 are maintained in their coaxial relation.

Pole pieces 33 for the magnet bars 27 are provided in the form of laminations of suitable magnetic material slidably mounted on said bars on the ends thereof adjacent the end plate 18. These pole pieces are formed to fit closely on said bars and are provided with peripheral contours as indicated at 34 forming cylindrical surfaces of substantially equal radius to the peripheries of end plate 18 and bridge member 22.

In order to position the pole pieces 33 on the bars 27, spacing members in the form of rings 35 of non-magnetic material are slidably mounted on said bars and arranged to completely fill the space between said pole pieces and the bridge member 22 so that when the bridge member 22 is drawn up against the magnets 27, pressure will be applied through the spacing rings 35 to the pole pieces 33 to compress the same and provide a rigid unified structure. The rings 35 are preferably made of a convenient width to serve as spacing means for the discs 28 whereby said discs may be spaced uniformly from end to end of the bars 27. It will be understood that sufficient spacing elements 35 will be provided so that suitable clamping pressure will be placed on the pole pieces 33 when the bridge member 22 has been brought up rigidly against the bars 27 by tightening the nut 24.

It will be noted that since the magnet bars 27 are of uniform cross section, the bars may be formed by rolling operations and require no further working of any kind. This obviously eliminates expensive and wasteful operations heretofore necessary and, in conjunction with the formation of the pole pieces and cooperating parts as punchings and forgings, provides an efficient and economical structure.

Although but one embodiment of the invention has been shown and described in detail, it will be understood that various changes may be made in the proportions and arrangements of the parts without departing from the spirit of the invention as described in the claims appended hereto.

What is claimed is:—

1. In a magneto, a rotor comprising a non-magnetic shaft, a plurality of bar magnets circumferentially spaced around said shaft, means for clamping the magnets on said shaft, magnetic pole pieces mounted on said magnets and non-magnetic means for spacing the pole pieces longitudinally on said magnets.

2. In a magneto, a rotor comprising a shaft, a non-magnetic end plate thereon, a magnetic bridge member on said shaft in spaced relation thereto, a plurality of circumferentially spaced bar magnets mounted between said plate and bridge member, and spaced non-magnetic members supporting said magnets on said shaft.

3. In a magneto, a rotor comprising a shaft, a non-magnetic end plate thereon, a magnetic bridge member on said shaft in spaced relation thereto, a plurality of circumferentially spaced bar magnets mounted between said plate and bridge member, and spaced non-magnetic discs having apertures adapted to receive and conform to the contour of said magnets, and splined to the shaft to support said magnets and connect them non-rotatably to said shaft.

4. In a magneto, a rotor comprising a shaft, a non-magnetic end plate thereon, a magnetic bridge member on said shaft in spaced relation thereto, a plurality of circumferentially spaced bar magnets mounted between said plate and bridge member, pole pieces mounted on said magnets adjacent said end plate, means for clamping the magnets between the end plate and bridge member and means including non-magnetic disk members on said magnets filling the spaces between the pole pieces and the bridge member whereby said pole pieces are positioned and held by said clamping means.

5. A magnetic rotor including a plurality of circumferentially spaced bar magnets, pole pieces mounted on one end of each of said bars, means to apply endwise clamping pressure to said bars to hold the same in assembled relation, and non-magnetic spacing means adapted to cooperate with said clamping means to position said pole pieces.

6. A magnet rotor including a plurality of circumferentially spaced bar magnets, pole pieces mounted on one end of each of said bars, a plurality of axially spaced non-magnetic discs having openings adapted to receive and support said bars, means to apply endwise clamping pressure to said bars to hold the same in assembled relation, and non-magnetic spacing means adapted to space said discs along the bars and to cooperate with said clamping means to position said pole pieces.

7. A magnet rotor including a shaft, a plurality of circumferentially spaced bar magnets, a plurality of axially spaced non-magnetic discs having openings adapted to receive said shaft and bars and support said bars, said bars having a non-circular cross section and said openings conforming thereto and preventing angular movement of the bars and means on said shaft to apply endwise pressure to said bars and said discs to hold the same in assembled relation.

8. A magnet rotor including a plurality of circumferentially spaced bar magnets, a plurality of axially spaced non-magnetic discs having openings adapted to receive and support said bars, said bars having a non-circular cross section and said openings conforming thereto and preventing angular movement of the bars, laminated pole pieces mounted on one end of each of said bars, and non-magnetic means mounted on said bars, arranged to space said discs along the the bars and to cooperate with said clamping means to position the pole pieces and discs.

9. A magnet rotor including a plurality of straight bar magnets of uniform cross section, means including a plurality of axially spaced disks for mounting said bars in parallel circumferentially spaced relation, pole pieces slidably mounted on one end of each of said bars, non-magnetic means slidably mounted on said bars for spacing said disks and for positioning said pole pieces on said bars, and means for clamping together said bars, mounting means, pole pieces and spacing means.

10. A magnetic rotor including a plurality of straight bar magnets of uniform cross section, a shaft, means for mounting said bars in parallel, circumferentially spaced relation about said shaft including a plurality of discs splined on said shaft and having openings for holding said bars, magnetic pole pieces slidably mounted on said bars, and means for clamping together said bars, discs and pole pieces.

11. A magnetic rotor including a plurality of straight bar magnets of uniform cross section, a shaft, means for mounting said bars in parallel, circumferentially spaced relation about said shaft including a plurality of discs splined on said shaft and having openings for holding said bars, a non-magnetic end plate fixed on said shaft and forming an abutment for one end of said bars, a magnetic bridge member adjustably mounted on said shaft in abutting relation to the opposite ends of said bars, magnetic pole pieces slidably mounted on said bars adjacent said end plate, and spacing means slidable on said bars whereby adjustment of the bridge member is effective to clamp the pole pieces on the bars.

In testimony whereof I have signed this specification.

ALBERT EGLI.